(12) United States Patent
Hanrahan et al.

(10) Patent No.: US 6,183,841 B1
(45) Date of Patent: Feb. 6, 2001

(54) OPTIMIZED LOW PROFILE SWAGE MOUNT BASE PLATE ATTACHMENT OF SUSPENSION ASSEMBLY FOR HARD DISK DRIVE

(75) Inventors: Kevin Hanrahan; Ryan Schmidt, both of Santa Barbara, CA (US)

(73) Assignee: Intri-Plex Technologies, Inc., Santa Barbara, CA (US)

( * ) Notice: Under 35 U.S.C. 154(b), the term of this patent shall be extended for 0 days.

(21) Appl. No.: 09/064,668

(22) Filed: Apr. 21, 1998

(51) Int. Cl.[7] .................................. G11B 5/48; B32B 3/24
(52) U.S. Cl. .......................... 428/132; 428/133; 428/596; 428/597; 428/131; 29/507; 29/523; 29/522.1; 29/603.04; 360/244.6
(58) Field of Search ...................... 428/132, 133, 428/596, 597, 131; 360/104, 244.6; 29/507, 523, 522.1, 603.04

(56) References Cited

U.S. PATENT DOCUMENTS

| | | | |
|---|---|---|---|
| 5,172,286 | * 12/1992 | Jurgenson | 360/104 |
| 5,185,683 | * 2/1993 | Oberg et al. | 360/104 |
| 5,191,705 | * 3/1993 | Toensing | 29/764 |
| 5,497,282 | * 3/1996 | Hoffmann et al. | 360/104 |
| 5,689,389 | 11/1997 | Braunheim | 360/104 |
| 5,717,545 | 2/1998 | Brooks, Jr. et al. | 360/104 |
| 5,796,555 | * 8/1998 | Aoyagi et al. | 360/104 |
| 5,812,343 | * 9/1998 | Budde et al. | 360/104 |

* cited by examiner

Primary Examiner—William P. Watkins, III
(74) Attorney, Agent, or Firm—Owen L. Lamb

(57) ABSTRACT

An optimized low profile swage mount or press-in fitted base plate for attachment of a suspension assembly to an actuator arm in a hard disk drive. The base plate has a base plate thickness, $T_{BP}$, overall height, $H_H$, hub inner diameter, $D_{ID}$, hub outer diameter, $D_{OD}$, hub inner surface depth, $H_{IS}$, hub radial width, $W_H$, which is one half the hub outer diameter minus the hub inner diameter $(D_{OD}-D_{ID})/2$, and a counter bore depth $H_{cb}$. The optimized parameters are such as to satisfy the following equation:

$$\frac{W_H}{T_{BP}} \cdot \frac{W_H}{(H_{IS} + H_H - H_{cb})/2} \geq 5$$

12 Claims, 4 Drawing Sheets and the transducer suspensions has been made more difficult

OPTIMIZED LOW PROFILE SWAGE MOUNT BASE PLATE ATTACHMENT OF SUSPENSION ASSEMBLY FOR HARD DISK DRIVE

CROSS-REFERENCE TO RELATED APPLICATION

The invention is related to copending application Ser. No. 09/003,872 filed Jan. 7, 1998 on behalf of Ryan Schmidt, et al. entitled "Method And Apparatus For Press-In Attachment Of Suspension Assembly In Hard Disk Drive" assigned to the same assignee as the present invention, which copending application is incorporated herein by reference.

BACKGROUND OF THE INVENTION

1. Field of the Invention

This invention relates to disk head assemblies for supporting read/write heads adjacent rotating disks in disk drives and more particularly, to a low profile base plate for attaching a head suspension assembly to a head actuator arm.

2. Description of the Prior Art

In hard disk drives data are stored on magnetizable surfaces of a plurality of rotatable disks that are mounted in a coaxial stack on a housing of the drive. Transducer heads that write data to and read data from the disk surfaces are supported by an actuator that is mounted on the housing and can be actuated to position the transducer heads in alignment with concentric data tracks defined on the disks. Each transducer head is attached to one end of a head suspension that is connected to an actuator arm that extends from the actuator body. Each suspension includes a flexible load beam constructed of light sheet steel that has a bend formed in it. The load beam acts as a spring that forces the head against the disk surface with an accurate pre-load or "gram load". Air turbulence caused by the rotating disks lifts the heads slightly off of the disks so that the heads fly on an air bearing across the disk surfaces. The air bearing force is counteracted by the suspension gram load.

The head suspension is attached to an actuator arm using a base plate that forms a part of the head suspension. The base plate includes a flat flange portion and a cylindrical hub portion or boss. The base plate hub is passed through a load beam clearance hole and the flange is spot welded to the load beam. Alternatively, the hub and load beam clearance hole are aligned and the flange is welded on the opposite side. The combined base plate, load beam and a flexure make up the head suspension, and the suspension has the hub of the base plate extending beyond the load beam and concentric with the clearance hole.

The hubs of the suspensions are inserted into actuator arm boss holes formed through actuator arms extending from an actuator body. In the middle actuator arms, the hubs of two suspensions enter the arm boss hole from each end of the hole, so that the transducer heads of the suspensions face in opposing directions. A swage ball is passed through the concentric cylindrical hubs to force the peripheries of the hubs to expand (swage) into tight interference engagement with the inner peripheries of the actuator arm boss holes.

Problems with this method of mounting transducer heads have arisen as the need for increased data storage capacity in hard disk drives has grown and the size of the disk drive has decreased to fit in small lap top computers. The problem of forming a strong connection between the actuator arms as the size of the components has become smaller. In the prior art, relatively high swaging forces are needed to insure that a base plate makes a strong connection with the actuator arm boss hole. As the parts get smaller and thinner, these high forces cause unacceptable large distortions in the load beam and cause pre-load changes.

It is therefore desirable to provide a base plate that has a lower profile than a conventional base plate, a torque retention capability comparable to the prior art and a reduced pre-load change caused by the swaging process.

SUMMARY OF THE INVENTION

Briefly, the invention is concerned with an optimized low profile base plate for attachment of a suspension assembly to an actuator arm in a hard disk drive. The base plate has a base plate thickness, $T_{BP}$, overall height, $H_H$, hub inner diameter, $D_{ID}$, hub outer diameter, $D_{OD}$, hub inner surface depth, $H_{IS}$; a hub radial width, $W_H$, which is the hub outer diameter minus the hub inner diameter $(D_{OD}-D_{ID})/2$, and a hub counter bore depth $H_{cb}$. The optimized parameters are such as to satisfy the following equation:

$$\frac{W_H}{T_{BP}} \cdot \frac{W_H}{(H_{IS}+H_H-H_{cb})/2} \geq 5$$

The invention has the advantage that gram load change inherent in swaging is reduced and a large retention torque can be created even in low hub height configurations that offer limited retention torque in a standard hub geometry.

BRIEF DESCRIPTION OF THE DRAWINGS

The invention will be described in greater detail with reference to the drawings in which.

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Figure 1A:
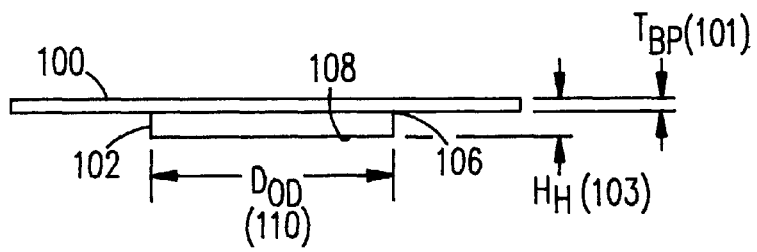
FIG. 1a is a side elevation cross-sectional view of a base plate of the prior art.
Figure 1B:
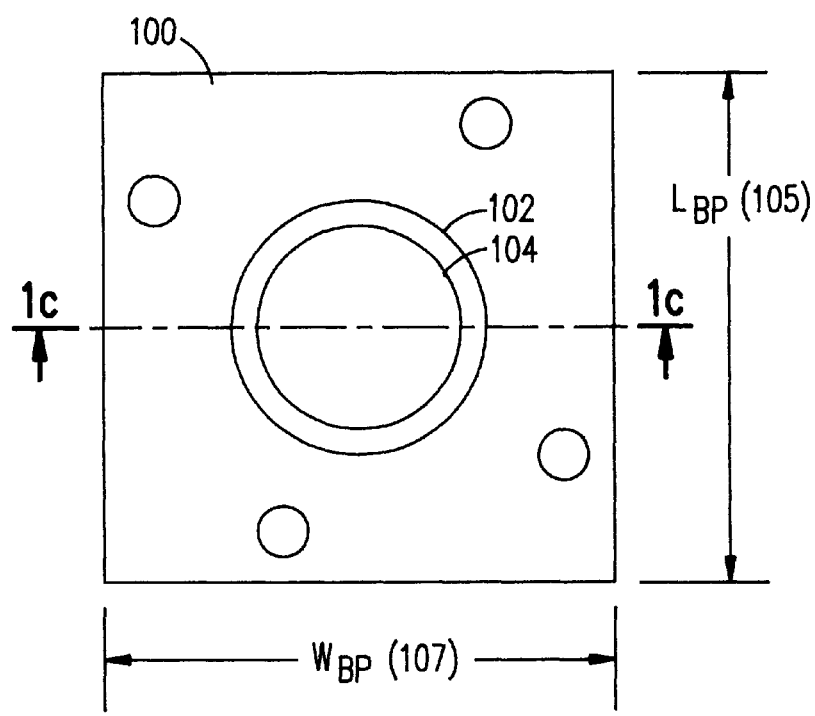
FIG. 1b is bottom view of the base plate of FIG. 2.
Figure 1C:
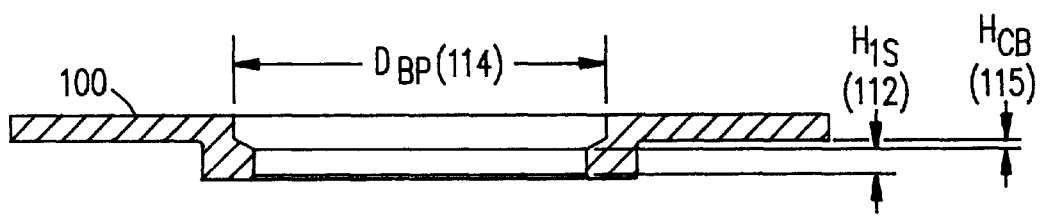
FIG. 1c is side elevation cross-sectional view of the base plate of FIG. 1b along the view line 1b—1b.

Refer to FIG. 1a which is a side elevation of the base plate of the present invention, FIG. 1b which is bottom view of the base plate of FIG. 1a and FIG. 1c which is side elevation cross-sectional view of the base plate of FIG. 1b along the view line 1b—1b. The base plate includes a flat flange portion 100 and a cylindrical hub portion or boss 102. The hub has an inner barrel with an inner diameter 104. The inner diameter is perpendicular to the plane of the base plate flange 100. The hub extends from a region 106 at which the hub meets the flange to an outer end 108 of the hub.

The base plate has the following parameters: a base plate thickness, $T_{BP}$, (101), overall height, $H_H$, (103), hub inner diameter, $D_{ID}$, (104), base plate length, $L_{BP}$, (105), base plate width, $W_{BP}$, (107), hub outer diameter, $D_{OD}$, (110), hub inner surface depth, $H_{IS}$, (112), base plate opening diameter, $D_{BP}$, (114), hub radial width, $W_H$, which is the hub outer diameter minus the hub inner diameter $(D_{OD}-D_{ID})/2$, and a hub counter bore depth $H_{cb}$ (115).

In a fully assembled magnetic disk drive, an actuator arm and head suspension, which are elements of an actuator arm assembly, are connected end to end by a base plate. In assembling the suspension, the hub 102 is inserted through a load beam boss hole in a load beam (not shown), which is part of the suspension. The flange portion 100 is welded to the load beam. The hub is then inserted in to an actuator arm boss hole in an actuator arm. The combined base plate, load beam and a flexure make up a head suspension, and the suspension typically has the hub of the base plate extending through and beyond the load beam clearance hole. Alternatively, the hub and load beam clearance hole are aligned and the flange is welded on the opposite side. A swage ball is passed through the center inner barrel of the hub 102 causing pressure to be applied to cause the hub 102 to expand into the boss hole in the actuator arm, rigidly connecting the hub and attached load beam to the actuator arm boss hole.

Figure 2A:
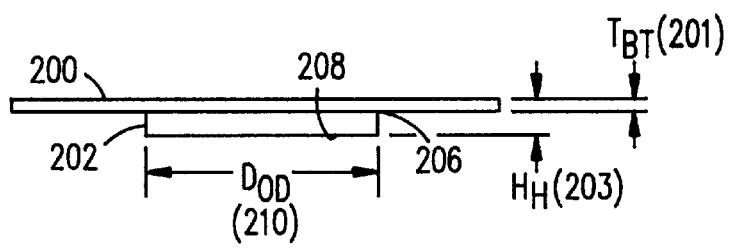
FIG. 2a is a side elevation cross-sectional view of a base plate in which the present invention is embodied.
Figure 2B:
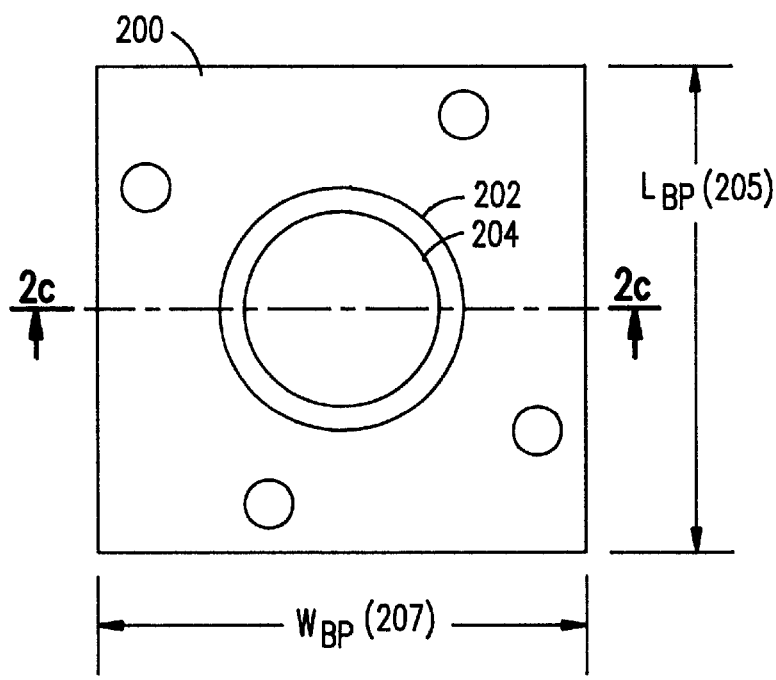
FIG. 2b is bottom view of the base plate of FIG. 2.
Figure 2C:
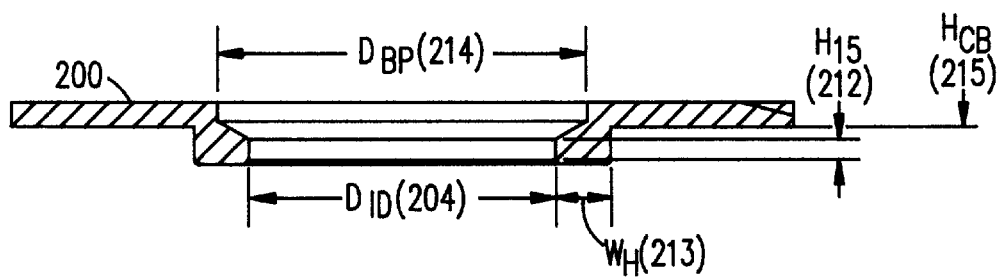
FIG. 2c is side elevation cross-sectional view of the base plate of FIG. 2b along the view line 2b—2b.

Refer to FIG. 2a which is a side elevation of the base plate of the present invention, FIG. 2b which is bottom view of the base plate of FIG. 2a and FIG. 2c which is side elevation cross-sectional view of the base plate of FIG. 2b along the view line 2b—2b. The base plate includes a flat flange portion 200 and a cylindrical hub portion or boss 202. The hub has an inner barrel with an inner diameter 204. The inner diameter is perpendicular to the plane of the base plate flange 200. The hub extends from a region 206 at which the hub meets the flange to an outer end 208 of the hub.

The base plate has the following parameters: a base plate thickness, $T_{BP}$, (201), overall height, $H_H$, (203), hub inner diameter, $D_{ID}$, (204), base plate length, $L_{BP}$, (205), base plate width, $W_{BP}$, (207), hub outer diameter, $D_{OD}$, (210), hub inner surface depth, $H_{IS}$, (212), base plate opening diameter, $D_{BP}$, (214), hub radial width, $W_H$, (213) which is the hub outer diameter minus the hub inner diameter $(D_{OD}-D_{ID})/2$, and a hub counter bore depth $H_{cb}$ (215).

The optimum parameters in accordance with the invention are such as to satisfy the following equation:

$$\frac{W_H}{T_{BP}} \cdot \frac{W_H}{(H_{IS}+H_H-H_{cb})/2} \geq 5$$

The actual parameters of one example of several base plates manufactured in accordance with the principles of the present invention as compared with the prior art are as follows.

| SYMBOL | NAME | TYP. PRIOR ART DIMENSION(MM) PN: 15120-09 | TYP. INVENTION DIMENSION(MM) PN: 15120-05 |
|---|---|---|---|
| $L_{BP}$ | Base Plate Length | 5.080 | 5.080 |
| $W_{BP}$ | Base Plate Width | 5.080 | 5.080 |
| $T_{BP}$ | Base Plate Thickness | 0.150 | 0.150 |
| $D_{BP}$ | Base Plate Opening Diameter | 2.375 | 2.510 |
| $D_{ID}$ | Hub Inner Diameter | 2.145 | 1.956 |
| $D_{OD}$ | Hub Outer Diameter | 2.731 | 2.731 |
| $H_H$ | Hub Overall Height | 0.270 | 0.269 |
| $H_{IS}$ | Hub Inner Surface Depth | 0.114 | 0.115 |
| $H_{CD}$ | Hub Counterbore Height | 0.038 | 0.127 |
| $W_H$ | Hub Radial Width | 0.293 | 0.3875 |
| | Geometry Metric Value | 3.308 | 7.810 |

The distal interior edge of the hub may be provided with a tapered chamfer to provide space for the displacement of material during the swaging operation.

Figure 3:
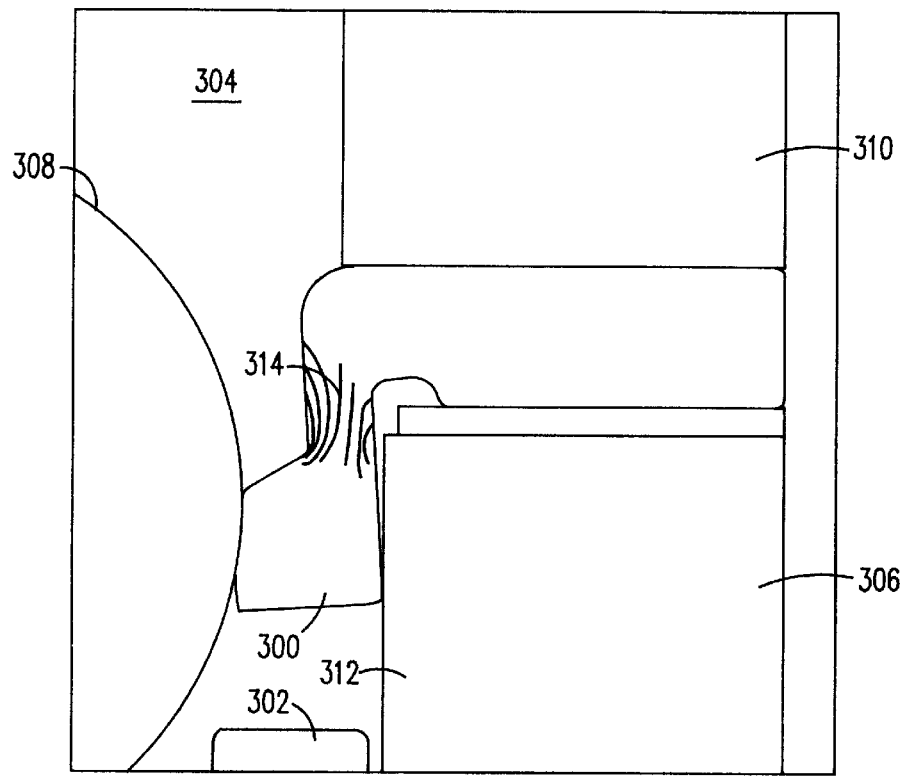
FIG. 3 is a chart of base plate design progression illustrated by a geometry metric value versus time in days.

Refer to FIG. 3 which is a finite element analysis image of strain on a base plate of the prior art. The swaging method entails clamping the actuator body in place in a fixture to prevent outward bending of the outermost actuator arms. A number of head suspension assemblies are placed in the actuator body such that base plate hubs 300, 302 in the suspensions are in vertical alignment with a corresponding boss hole 304 in an actuator arm 306 extending from an actuator body (not shown). The head suspension assemblies are radially aligned with a pin that passes through tooling holes in the distal end of the suspensions and into the fixture. A swage ball 308 is passed through the center inner barrel of the vertically aligned hubs of the base plates causing pressure to be applied to cause the hubs to expand into the corresponding boss hole in the actuator arm, rigidly connecting each hub and attached load beam 310 to wall 312 of the corresponding actuator arm boss hole. The resulting strain contour lines 314 are vertical and are consistent with a bending moment applied to the "neck" region 315. This moment on the neck region 315 provides the means for decoupling the hub region 300 and the flange region 316.

Figure 4:
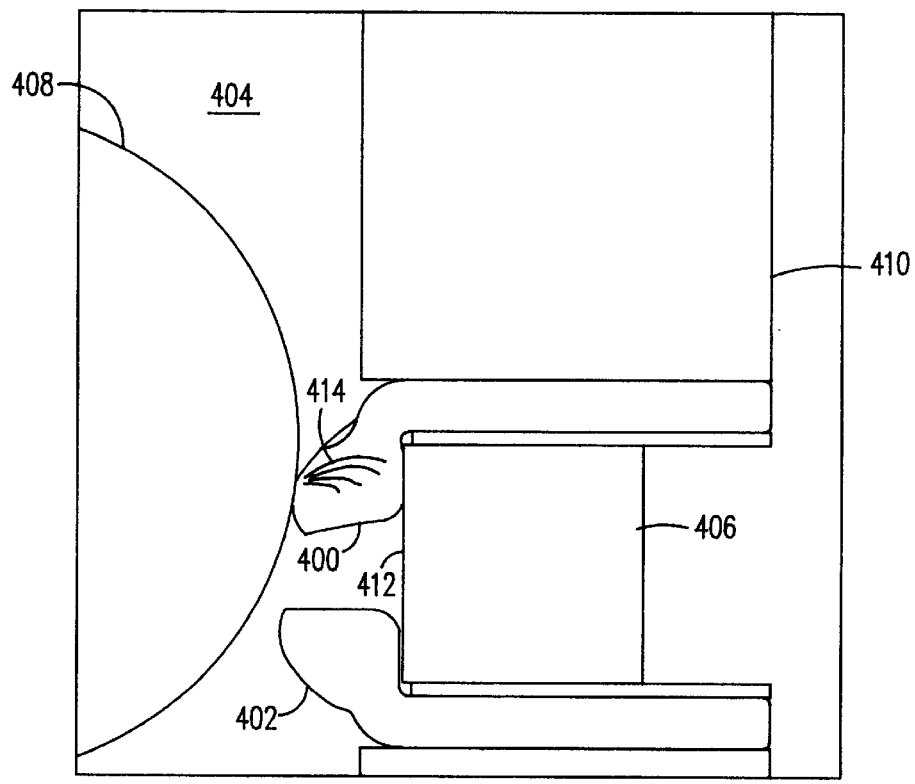
FIG. 4 is a finite element analysis image of strain on a base plate of the prior art during swaging; and, FIG. 5 is a finite element analysis image of strain on a base plate of the present invention during swaging.

Refer to FIG. 4 which is a computer image of strain on a base plate of the present invention. The swaging method entails clamping the actuator body in place in a fixture to prevent outward bending of the outermost actuator arms. A number of head suspension assemblies are placed in the actuator body such that base plate hubs 400, 402 in the suspensions are in vertical alignment with a corresponding boss hole 404 in an actuator arm 406 extending from an actuator body (not shown). The head suspension assemblies are radially aligned with a pin that passes through tooling holes in the distal end of the suspensions and into the fixture. A swage ball tool 408 is passed through the center inner barrel of the vertically aligned hubs of the base plates causing pressure to be applied to cause the hubs to expand into the corresponding boss hole in the actuator arm, rigidly connecting each hub and attached load beam 410 to wall 412 of the corresponding actuator arm boss hole. The resulting strain contour lines 414 are horizontal and are consistent with a shear applied to the hub region 415. This shear on the hub region 415 provides the means for decoupling the hub region 415 and the flange region 416. This is extremely useful as there exists no neck region to provide bending moment decouple.

The principles of the invention have been described for base plates that are swaged. However, those skilled in the art will realize that the method of manufacture described herein can be utilized to create low profile base plates for press-in fitting. Copending application Ser. No. 09/003,872 describes a novel method of assembling a disk drive using a press fitted base plate. The method comprises steps of clamping an actuator body in place in a fixture to prevent outward bending of the outermost actuator arms, placing a number of head suspension assemblies in the actuator body such that base plate hubs in the suspensions are in alignment with corresponding boss holes in actuator arms extending from the actuator body, radially aligning the head suspension assemblies with a pin that passes through tooling holes in the suspensions and into the fixture, inserting a tool between the actuator arms and in alignment with the base plates, and activating the tool a reach sufficient to urge each base plate hub into a corresponding boss hole. The tool comprises closed jaws and the tool is activated by opening the jaws by, for example, driving a wedge between the closed jaws. An advantage of base plate constructed in accordance with the teachings the present invention is that it allows the use of a base plate having a low profile with the press-in method and apparatus.

Figure 5:
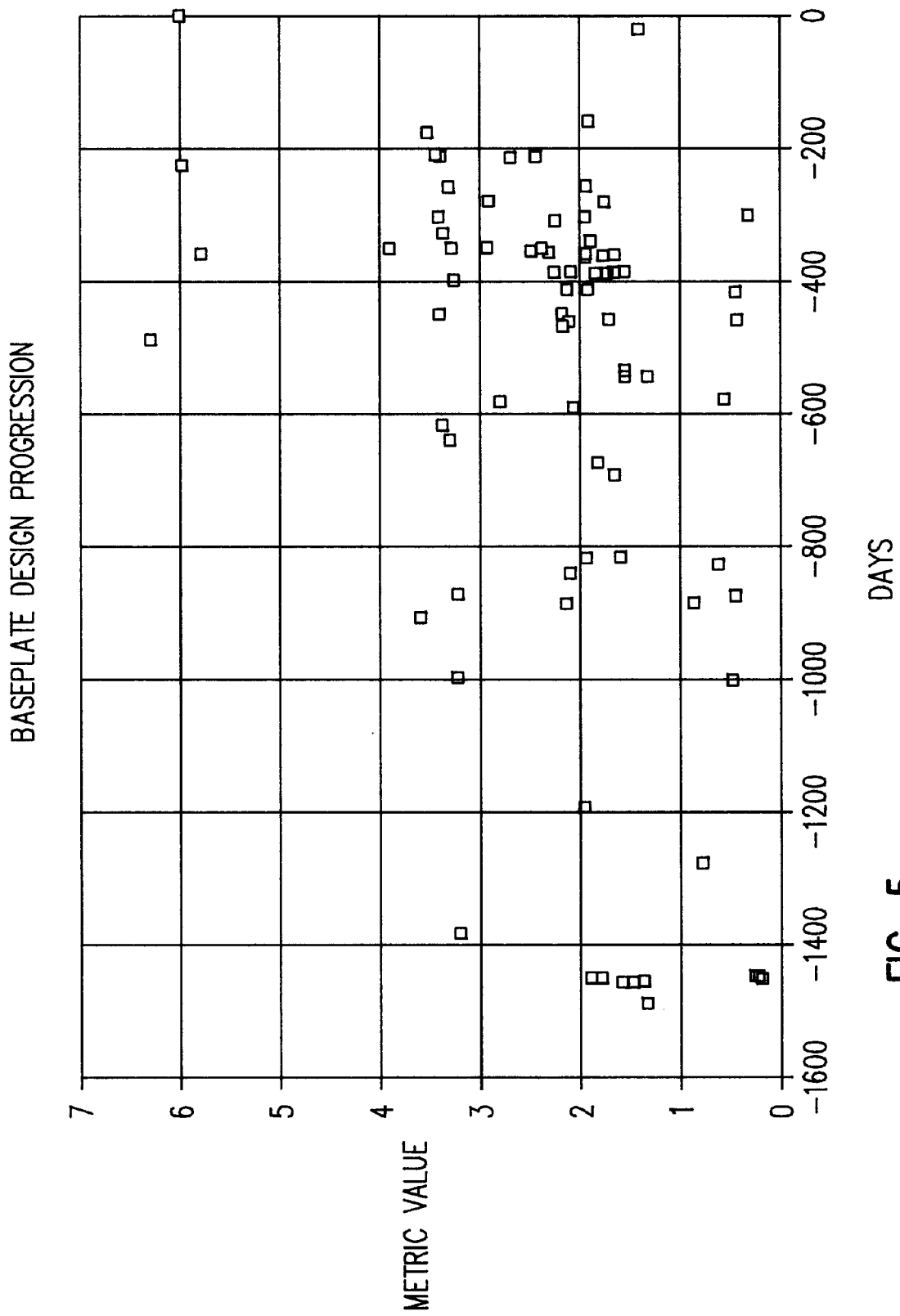

Refer to FIG. 5 which is a chart of base plate design progression The X-axis geometry metric value versus time in days on the Y-axis. In the past, the geometry of the base plate was such as to provide a strain isolation region in the neck of the base plate so as to isolate the effects of swaging on the base plate. This resulted in vertical strain lines as shown in FIG. 3. A plot of the geometry metric calculated in accordance with the above equation shows that all parts tested during the 1500 days covered by the chart resulted in a geometry metric value that was less than 5. The four parts designed in accordance with the teachings of the present invention resulted in a metric that was greater than 5.

While the invention has been particularly shown and described with reference to preferred embodiments thereof, it will be understood by those skilled in the art that the foregoing and other changes in form and detail may be made therein without departing from the scope of the invention.

What is claimed is:

1. An optimized low profile base plate for attachment of a suspension assembly to an actuator arm in a hard disk drive comprising:

a flange having a flange thickness ($T_{BP}$); and, a hub having, a hub height ($H_H$), a hub radial width $W_H$, a land height hub inner surface depth ($H_{IS}$), and a lead in shoulder hub counter bore height ($H_{CB}$);

wherein:

$$\frac{W_H}{T_{BP}} \cdot \frac{W_H}{(H_{IS} + H_H - H_{cb})/2} \geq 5.$$

2. The base plate of claim 1 wherein, in millimeters,:
$T_{BP}$=0.15
$W_H$=0.3875
$H_{IS}$=0.115
$H_H$=0.269
$H_{cb}$=0.127.
3. The base plate of claim 1 wherein, in millimeters:
$T_{BP}$=0.15±0.010
$W_H$=0.3875±0.02
$H_{IS}$=0.115±0.025
$H_H$=0.269±0.025
$H_{cb}$=0.127±0.025.

4. An optimized low profile base plate for attachment of a suspension assembly to an actuator arm in a hard disk drive comprising:

a flange having a flange thickness ($T_{BP}$); and, a hub having a hub height ($H_H$), a wall thickness $W_H$, a land height hub inner surface depth ($H_{IS}$), and a lead in shoulder hub counter bore height ($H_{CB}$);

wherein:

$$8 \geq \frac{W_H}{T_{BP}} \cdot \frac{W_H}{(H_{IS} + H_H - H_{cb})/2} \geq 5.$$

5. The base plate of claim 4 wherein, in millimeters:
$T_{BP}$=0.15
$W_H$=0.3875
$H_{IS}$=0.115
$H_H$=0.269
$H_{cb}$=0.127.
6. The base plate of claim 4 wherein:
$T_{BP}$=0.15±0.010
$W_H$=0.3875±0.02
$H_{IS}$=0.115±0.025
$H_H$=0.269±0.025
$H_{cb}$=0.127±0.025.
7. A method of making an optimized low profile base plate for attachment of a suspension assembly to an actuator arm in a hard disk drive comprising steps of:

A. fabricating a flange having a flange thickness ($T_{BP}$); and,

B. shaping a hub extending from said flange, said hub having, a hub height ($H_H$), a hub radical width $W_H$, a land height hub inner surface depth ($H_{IS}$), and a lead in shoulder hub counter bore height ($H_{CB}$);

wherein:

$$\frac{W_H}{T_{BP}} \cdot \frac{W_H}{(H_{IS} + H_H - H_{cb})/2} \geq 5.$$

8. The method of claim 7 wherein, in millimeters:
$T_{BP}$=0.15
$W_H$=0.3875
$H_{IS}$=0.115
$H_H$=0.269
$H_{cb}$=0.127.
9. The method of claim 7 wherein, in millimeters:
$T_{BP}$=0.15±0.010
$W_H$=0.3875±0.02
$H_{IS}$=0.115±0.025
$H_H$=0.269±0.025
$H_{cb}$=0.127±0.025.
10. A method of making an optimized low profile base plate for attachment of a suspension assembly to an actuator arm in a hard disk drive comprising steps of:

A. fabricating a flange having a flange thickness ($T_{BP}$); and,

B. shaping a hub extending from said flange, said hub having, a hub height ($H_H$), a wall $W_H$, a land height hub inner surface depth ($H_{IS}$), and a lead in shoulder hub counter bore height ($H_{CB}$);

wherein:

$$8 \geq \frac{W_H}{T_{BP}} \cdot \frac{W_H}{(H_{IS} + H_H - H_{cb})/2} \geq 5.$$

11. The base plate of claim 10 wherein, in millimeters:
$T_{BP}$=0.15
$W_H$=0.3875
$H_{IS}$=0.115
$H_H$=0.269
$H_{cb}$=0.127.

12. The base plate of claim 10 wherein, in millimeters:
$T_{BP}$=0.15±0.010
$W_H$=0.3875±0.02
$H_{IS}$=0.115±0.025
$H_H$=0.269±0.025
$H_{cb}$=0.127±0.025.

* * * * *

UNITED STATES PATENT AND TRADEMARK OFFICE
CERTIFICATE OF CORRECTION

| | | |
|---|---|---|
| PATENT NO. | : 6,183,841 B1 | Page 1 of 1 |
| APPLICATION NO. | : 09/064668 | |
| DATED | : February 6, 2001 | |
| INVENTOR(S) | : Kevin Hanrahan and Ryan Schmidt | |

It is certified that error appears in the above-identified patent and that said Letters Patent is hereby corrected as shown below:

In the abstract, line 4, after "$T_{BP}$", insert --hub--.

In the drawings:

Sheet 1, Fig. 1a, the upper arrow for $H_H$ (103) should be in contact with the lead line for surface 106;

Sheet 2, Fig. 2a, the upper arrow for $H_H$ (203) should be in contact with the lead line for surface 206;

Sheet 1, Fig. 1c, change "$H_{1S}$" to --$H_{IS}$--;

Sheet 2, Fig. 2c, change "$H_{15}$" to --$H_{IS}$--.

Column 2, line 17, after "$T_{BP}$", insert --hub--.

Column 3, line 6, after "$T_{BP}$, (101)," insert --hub--; line 49, after "$T_{BP}$, (201)," insert --hub--.

Column 4, line 16, change "$H_{CD}$" to --$H_{CB}$--.

Signed and Sealed this

Fifth Day of December, 2006

JON W. DUDAS
*Director of the United States Patent and Trademark Office*